(12) United States Patent
Maccone et al.

(10) Patent No.: US 6,197,903 B1
(45) Date of Patent: Mar. 6, 2001

(54) PREPARATION OF SULPHONIC FLUORINATED POLYMER SOLUTIONS

(75) Inventors: Patrizia Maccone, Milan; Alberto Zompatori, Bologna, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/281,913

(22) Filed: Mar. 31, 1999

(30) Foreign Application Priority Data

Nov. 23, 1998 (IT) .............................................. MI98A2523

(51) Int. Cl.$^7$ .................................................. C08F 114/18
(52) U.S. Cl. ........................ 526/243; 526/247; 526/248; 526/249; 526/253
(58) Field of Search ..................... 526/243, 247, 526/248, 249, 253

(56) References Cited

U.S. PATENT DOCUMENTS

| | | |
|---|---|---|
| 3,674,800 | 7/1972 | Sweeney et al. . |
| 3,706,773 | 12/1972 | Anello et al. . |
| 4,275,226 * | 6/1981 | Yamabe et al. ....................... 560/183 |
| 4,341,685 | 7/1982 | Miyake et al. . |
| 4,348,310 | 9/1982 | Silva et al. ............................ 524/167 |
| 4,433,082 | 2/1984 | Grot et al. . |
| 4,453,991 | 6/1984 | Grot et al. . |
| 4,540,716 | 9/1985 | Covitch et al. ........................ 521/28 |
| 4,844,719 * | 7/1989 | Toyomoto et all. ...................... 55/16 |
| 5,288,384 * | 2/1994 | Banerjee ................................ 204/252 |
| 5,532,310 | 7/1996 | Grenfell et al. ....................... 524/463 |
| 5,654,263 | 8/1997 | Abusleme et al. .................... 510/365 |
| 5,958,822 * | 9/1999 | Beckerbauer et al. ............... 502/168 |

FOREIGN PATENT DOCUMENTS

| | | |
|---|---|---|
| 245 144 A1 | 11/1987 | (EP) . |
| 0 366 482 * | 5/1990 | (EP) . |
| 712 944 A2 | 5/1996 | (EP) . |
| 1 286 859 | 8/1972 | (GB) . |
| WO 95/32174 | 11/1995 | (WO) . |
| WO 98/16581 | 4/1998 | (WO) . |

OTHER PUBLICATIONS

R. Moore et al., "Morphology and Chemical Properties of the Dow Perflourosulfonate Ionomers", *Macromolecules*, 22, 1989, pp. 3594–3599.

* cited by examiner

*Primary Examiner*—Helen L. Pezzuto
(74) *Attorney, Agent, or Firm*—Arent, Fox, Kintner, Plotkin & Kahn

(57) ABSTRACT

A process for preparing a solution and/or dispersion containing sulphonic (per)fluorinated ionomers having —$SO_3M$ functional groups, wherein M is selected from H, Li, Na, K, $NR_4$ (R equal to or different from each other are selected from H, $CH_3$, $C_2H_5$), characterized in that it dissolves the above defined ionomers at a temperature comprised between the room temperature and about 150° C., in a monophasic ternary mixture essentially constituted by water, by a $C_1$–$C_4$ alcohol and by a fluoro(poly)oxyalkylene having one hydrogen atom in at least a fluorinated end group; the dispersed polymer particle sizes are in the range 30–100 nm.

13 Claims, No Drawings

PREPARATION OF SULPHONIC FLUORINATED POLYMER SOLUTIONS

The present invention relates to a process for preparing fluorinated polymer solutions at low temperature having sulphonic functional groups and to liquid compositions obtainable from said process.

Specifically, the invention relates to solutions obtainable with a process in which a temperature between the room temperature and about 150° C., preferably between 50° C. and 100° C., is used. The liquid compositions obtainable from said process are stable solutions and/or dispersions wherein the particle sizes, determined by dynamic laser light scattering (DLLS), are in the range 30–100 nm, preferably 40–70 nm, the distribution being monomodal The invention liquid compositions contain an amount of fluorinated polymers having sulphonic functional groups (ionomers) ranging from about 0.5% and about 30% by weight. The equivalent weight of said fluorinated polymer is in the range of about 400–1300, preferably between 650–800 nm, still more preferably between 730–795 nm.

The preparation of solutions and/or dispersions of sulphonic (per)fluorinated ionomers having different equivalent weight (EW) is known in the art.

As equivalent weight, the polymer weight in acid form necessary to neutralize a NaOH equivalent is meant; the equivalent weight is determined by polymer titration in the acid form with a standard NaOH solution.

GB 1,286,859 describes ionomer dispersions having equivalent weight not higher than 1060 using an aqueous solution containing at least 5% by weight of an organic solvent. As organic solvents primary, secondary and tertiary $C_1$–$C_4$ alcohols; amides such as dimethylacetamide, dimethylformamide; acetone, etc., are mentioned. The used organic solvent feature is to have a boiling point lower than 130° C. such that they are easily removable after polymer casting and a solubility in water of at least 5% by weight. The temperatures used in the examples for the dissolution process are comprised between the room temperature and 100° C.

Tests carried out by the Applicant have shown that by the process described in said patent, the dispersed particle sizes are in the range of about 150–300 nm. As it is well known, as the particle size increases, the polymer concentration being equal, the specific surface decreases. Therefore sizes of this order limit the sulphonic group availability on the particle surface and therefore reduce the ionomer efficiency in all those applications where an high presence of such groups is required, as in the case of impregnation treatments on porous supports, for example of PTFE or ceramic materials.

Dissolution processes with hydroalcoholic mixtures at temperatures higher than at least 180° C. and up to 350° C. for ionomers having equivalent weights higher than about 1000, are also known.

See for example U.S. Pat. No. 4,433,082 which describes a dissolution process in a liquid medium of ionic exchange (per)fluorinated polymers having —$SO_3M$ functional groups, wherein M is H, Na, K having an equivalent weight in the range 1025–1500. Water, optionally containing alcohols, is used. A mixture constituted by 20–90% by weight of water and by 10–80% by weight of an alcohol ($C_1$–$C_4$) and/or other solvents miscible in water in a dissolution temperature range from 180 to 300° C., preferably from 210° C. to 250° C., is for example mentioned. Such dissolution is carried out for at least 0.5 h in a closed vessel obtaining two liquid phases having a different density, wherefore it is necessary to separate the phase having a lower density from the one containing the polymer.

The disadvantage of this process is to operate at high temperatures leading to corrosion of the used containers (autoclaves). For this reason the used materials are special steels, e.g. Hastelloy. Also in this case it is however necessary a surface treatment since the corrosion takes place all the same even though in longer times.

In the publication by R. B. Moore, III, C. R. Martin, Macromolecules 22, 3594–3599 of 1989 the dissolution conditions for sulphonic perfluorinated ionomers having an equivalent weight in the range of about 600–1300 are reported. Also in this case the polymer is dissolved in hydroalcoholic mixtures and it is pointed out that the temperature necessary to dissolve the sulphonic perfluorinated ionomers changes with the used ionomer equivalent weight. It is meaningful to note that also for the ionomers having equivalent weight lower than 1000 the dissolution method requires the use of high operating temperatures, always higher than 240° C., and of dissolution times higher than one hour.

Patent Application WO 98/16581 relates to a dissolution process at high temperature (150–350° C.) to obtain solutions and/or dispersions comprising sulphonic perfluorinated ionomers. The dispersion medium is substantially water, free of alcohols. An example is reported wherein the dissolution of a sulphonic copolymer TFE/perfluoro(3-oxa-4-pentenesulphonylfluoride) in —$SO_3H$ form having an equivalent weight lower than 800 at a temperature of 230° C. for 5 hours under stirring, is shown. Besides, a dissolution method in a non aqueous medium constituted by alcohols and/or organic solvents miscible in water is described. Also in this case it is necessary to operate at temperatures in the range 150° C.–350° C. According to this patent at least 25% of the polymer particles have a size in the range of about 2–30 nm, determined by low angle X rays measurements.

Experiments carried out by the Applicant (see the Examples) have shown that the distribution is bimodal, wherein at least 50% of the particle distribution is about 120 nm. Therefore also in this case the same disadvantages described for GB 1,286,859 are present.

In the mentioned patents, the high temperature required to obtain the sulphonic (per)fluorinated ionomer dissolution in a dispersion medium involves the use of autoclaves constituted by special corrosion-resistant materials, as described in patent WO 98/16581, thus determining an increase of the plant costs. When not valuable steels are used, corrosion problems and consequent pollution of the final solution from the metals constituting the autoclave take place, making it not very suitable to be used in all the applications where an high purity, for instance in electrolytic and fuel cells, is required.

The need was felt to have available solutions and/or dispersions of ionomers obtainable by a process which does not require high temperatures, preferably without the use of equipments under pressure (autoclaves) and contemporaneously allows to obtain the dispersed polymer particle sizes in the range 30–100 nm, preferably 40–70 nm. As said, the particle size reduction involves an increase of the respective specific surface, the dispersed polymer concentration being equal, with consequent result improvement in impregnation, casting, etc. applications.

The Applicant has surprisingly and unexpectedly found that it is possible to solubilize sulphonic (per)fluorinated ionomers in suitable solvent mixtures at low temperature contemporaneously obtaining particles having sizes in the above indicated range, overcoming the above mentioned disadvantages of the prior art.

An object of the present invention is a process to prepare a solution and/or dispersion containing sulphonic (per) fluorinated ionomers having —SO$_3$M functional groups, wherein M is selected from H, Li, Na, K, NR$_4$ (R equal to or different from each other are selected from H, CH$_3$, C$_2$H$_5$), preferably H, characterized in that it dissolves the ionomers above defined at a temperature comprised between the room temperature and about 150° C., preferably between 50° C. and 100° C., in a monophasic ternary mixture essentially constituted by water in a percentage in the range 0.1%–50% by weight, by a C$_1$–C$_4$ alcohol in a percentage in the range 50%–99% by weight and by a fluoro(poly) oxyalkylene having one hydrogen atom in at least a fluorinated end group, preferably in both terminals, in a percentage in the range 0.1%–40% by weight; wherein the dispersed polymer particle sizes, determined by dynamic laser light scattering (DLS), are in the range 30–100 nm, preferably 40–70 nm, the distribution being monomodal.

Another object of the invention are liquid compositions obtainable from the above mentioned process comprising a (per)fluorinated ionomer amount in the range 0.5%–30% by weight, having equivalent weight from about 400 to 1300, preferably between 650–800, still more preferably 730–795, and dispersed particle sizes in the range 30–100 nm, preferably 40–70 nm.

The present invention sulphonic (per) fluorinated ionomers are obtained by the polymerization of a monomer having structure (I) with a monomer having structure (II):

$$CF_2=CZZ' \qquad (I)$$

wherein: Z and Z' are independently selected from H, Cl, F, CF$_3$, preferably they are F.

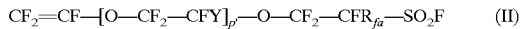

$$CF_2=CF-[O-CF_2-CFY]_{p'}-O-CF_2-CFR_{fa}-SO_2F \qquad (II)$$

wherein: Y is selected from F, CF$_3$; R$_{fa}$ is selected from F, Cl, C$_1$–C$_4$ perfluoroalkylic group, preferably it is F; p' is an integer selected from 0, 1, 2, preferably it is 0.

From the polymerization, (per)fluorinated sulphonic copolymers are obtained having the following repeating units:

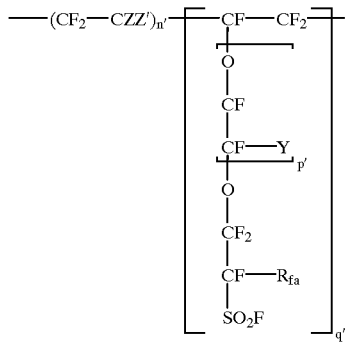

wherein: Z, Z', Y, R$_{fa}$, p' have the above defined meaning; n' is an integer in the range 1–15, q' is an integer in the range 1–10, n'/q' is in the range 1–10 and the ionomer equivalent weight is in the range of about 400–1300, preferably between 650–800, still more preferably between 750–795.

After the polymerization, the —SO$_2$F fluorosulphonic groups conversion in ionic form is necessary before proceeding to the polymer dissolution in the monophasic ternary mixture of the present invention. The conversion requires alkaline hydrolysis to obtain the —SO$_3$M form where M is selected from Li, Na, K, NR$_4$ (R=H, CH$_3$, C$_2$H$_5$), and optional subsequent acid hydrolysis to obtain the —SO$_3$H form. The acid form —SO$_3$H is preferred.

The preferred ternary mixture used for the ionomer dissolution is constituted by water in a percentage in the range 5–20% by weight, by a C$_1$–C$_4$ primary alcohol in a percentage in the range 65%–85% and by a fluoro(poly)oxyalkylene having hydrogenated terminals, with a boiling temperature in the range 80° C.–120° C., in a percentage in the range 5%–25% by weight.

Ternary mixtures of the mentioned components show a ternary diagram characterized by a wide monophasic zone wherein the three components form limpid and stable solutions as shown in the patent U.S. Pat. No. 5,654,263 in the name of the Applicant, herein incorporated by reference.

The existing zone width of such monophase can even considerably change in connection with the type of the used alcohol and fluoro(poly)oxyalkylene, particularly in connection with the boiling temperature and the hydrogen content. At any rate, for the skilled in the field, it is sufficient to carry out some mixing tests of the three components to identify the monophase existing zone.

According to a not binding theory, the Applicant deems that the introduction of the fluorinated component [fluoro (poly)oxyalkylene] in the solvent mixture allows an effective salvation of the ionomer hydrophobic fluorinated part which, combined to the salvation of the ionomer polar part through the mixture hydroalcoholic component, brings to an improved macromolecule solubilization and therefore a dispersed aggregate size reduction. This is possible thanks to the formation of a single phase comprising both the hydrophobic fluorinated part and the two hydrophilic hydrogenated components.

The effect caused by the introduction of the fluorinated compound in the solvent mixture seems to destructurize the ionic clusters formed by the ionomeric macromolecules, thus allowing a reduction in the particle size.

Experiments carried out by the Applicant have shown that, being constant the ratio between water and alcohol in the monophase of the invention, a gradually increase of the hydroperfluoropolyether leads to a decrease of the size of the ionic clusters. This effect was completely unexpected in view of the prior art.

The particle size distribution obtained by dissolving the ionomer in the monophase of the invention is surprisingly and unexpectedly monomodal.

A further advantage of the process of the present invention with respect to the prior art resides in the fact that no separation step of the organic phase is required. In fact with the dissolution process of the present invention only one phase is obtained.

From the industrial point of view this is a relevant simplification of the industrial process.

The process of the present invention comprises the dissolution of a sulphonic (per)fluorinated ionomer amount ranging from about 0.5% to about 30% by weight in the above defined monophasic ternary mixture at a temperature lower than about 150° C. for about 2 hours. The obtained solutions are limpid and transparent and with an increasing growing viscosity as the ionomer concentration increases. In order to verify the solution stability they are subjected to ultracentrifugation to speed up the particle sedimentation process. With the invention process it has been found that by ultracentrifugation no substantial ionomer separation is noticed.

As said, the dissolution temperatures can range from the room one up to about 150° C. in connection with the equivalent weight of the ionomer to be dissolved. As sulphonic (per)fluorinated ionomers the ones having low equivalent weight and those having high equivalent weight up to about 1300 can be used.

In order to obtain the monophasic ternary mixture used in the present invention the following alcohols: methanol, ethanol, n-propanol, isopropanol, butanol, isobutanol, etc. can be used; primary alcohols such as methanol and propanol are preferably used.

In order to obtain the monophasic ternary mixture used in the present invention fluoropolyoxyalkylenes comprising one or more repeating units, statistically distributed along the chain, selected from:
—CFZO—, —CF$_2$CFZO—, —CF$_2$CF(CF$_3$)O—, —CF(CF$_3$)O—, —CZ$_2$CF$_2$CF$_2$O—, —CF$_2$CF(OR$_{fb}$)O—, —CF(OR$_{fb}$)O—
can be used, wherein Z is —H or —F; R$_{fb}$ is —CF$_3$, —C$_2$F$_5$, or —C$_3$F$_7$; and by hydrogenated end groups selected from —CF$_2$H, —CF$_2$CF$_2$H, —CFH—CF$_3$, and —CFH—OR$_{fb}$, wherein R$_{fb}$ is defined as above, or perfluorinated end groups selected from —CF$_3$, —C$_2$F$_5$, and —C$_3$F$_7$, at least one of the end groups containing one hydrogen atom. One or more of the fluorine atoms of the terminal end can be substituted by chlorine.

The average molecular weight of the above mentioned fluoropolyoxyalkylenes is such that the boiling range, at the pressure of 1 atm, is generally in the range 25°–200° C., preferably 50–150° C., more preferably 80–120° C.

Specifically, fluoropolyoxyalkylenes containing at least one hydrogen atom in the end groups as above defined, can be selected from the following classes:

(a) T$_1$—O(CF$_2$—CF(CF$_3$)O)$_a$(CFXO)$_b$—T$_2$ wherein:
T$_1$ and T$_2$, equal to or different from each other, are —CF$_2$H, —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; a/b is in the range 5–15;

(b) T$_3$—O(CF$_2$CF$_2$O)$_c$(CF$_2$O)$_d$—T$_4$ wherein:
T$_3$ and T$_4$, equal to or different from each other, are —CF$_2$H or —CF$_2$—CF$_2$H hydrogenated groups, or —CF$_3$, —C$_2$F$_5$ perfluorinated groups, at least one of the end groups being hydrogenated, preferably both; c/d is in the range 0.3–5;

(c) T$_5$—O(CF$_2$—CF(CF$_3$)O)$_e$(CF$_2$CF$_2$O)$_f$(CFXO)$_g$—T$_6$ wherein:
T$_5$ and T$_6$, equal to or different from each other, are —CF$_2$H, —CF$_2$CF$_2$H, or —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; e/(f+g) is in the range 1–10, f/g is in the range 1–10;

(d) T$_7$—O(CF$_2$—CF(CF$_3$)O)$_h$—T$_8$ wherein:
T$_7$ and T$_8$ are —CFH—CF$_3$ hydrogenated groups, or —C$_2$F$_5$, —C$_3$F$_7$ perfluorinated groups, at least one of the end groups being hydrogenated;

(e) T$_9$—O(CZ$_2$CF$_2$CF$_2$O)$_i$—T$_{10}$ wherein:
Z is F or H; T$_9$ and T$_{10}$, equal to or different from each other, are —CF$_2$H or —CF$_2$—CF$_2$H groups, or —CF$_3$, C$_2$F$_5$, —C$_3$F$_7$ perfluorinated groups, at least one of the end groups being hydrogenated;

(f) T$_{11}$—O(CF$_2$O)$_j$(CF$_2$CF(OR$_{fb}$)O)$_k$(CF(OR$_{fb}$)O)$_l$—T$_{12}$ wherein:
R$_{fb}$ is —CF$_3$, —C$_2$F$_5$, or —C$_3$F$_7$; T$_{11}$ and T$_{12}$, equal to or different from each other, are —CF$_2$H, —CF$_2$CF$_2$H, —CFH—OR$_{fb}$ groups, or —CF$_3$, —C$_2$F$_5$, —C$_3$F$_7$ perfluorinated groups, at least one of the end groups being hydrogenated; k+l and j+k+l are at least equal to 2, k/(j+l) is in the range $10^{-2}$–$10^3$, l/j is in the range $10^{-2}$–$10^2$;

(g) T$_{13}$—O(CF$_2$—CF(CF$_3$)O)$_m$(CFXO)$_n$(CFHO)$_o$(CF$_2$CFHO)$_p$—T$_{14}$ wherein:
T$_{13}$ and T$_{14}$, equal to or different from each other, are —CF$_2$H, —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; m/n is in the range 5–40, m/(o+p) is in the range 2–50, o+p is at least 3, or is lower than p;

(h) T$_{15}$—O(CF$_2$CF$_2$O)$_q$(CF$_2$O)$_r$(CFHO)$_s$(CF$_2$CFHO)$_t$—T$_{16}$ wherein:
T$_{15}$ and T$_{16}$, equal to or different from each other, are —CF$_2$H, —CF$_2$—CF$_2$H hydrogenated groups, or —CF$_3$, —C$_2$F$_5$ perfluorinated groups, at least one of the end groups being hydrogenated; q/r is in the range 0.5–2, (q+r)/(s+t) is in the range 3–40, s+t is at least 3, s is lower than t;

(i) T$_{17}$—O(CF$_2$—CF(CF$_3$)O)$_u$(CF$_2$CF$_2$O)$_v$(CFXO)$_w$(CFHO)$_x$(CF$_2$CFHO)$_y$—T$_{18}$ wherein:
T$_{17}$ and T$_{18}$, equal to or different from each other, are —CF$_2$H, —CF$_2$CF$_2$H, —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; (u+v)/w is in the range 5–40, (u+v)/(x+y) is in the range 2–50, x+y is at least 3, x is lower than y.

The fluoropolyoxyalkylenes which can be used in the monophasic ternary mixture used in the present invention preferably have general formula:

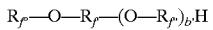

wherein R$_f$, R$_{f'}$, R$_{f''}$ equal to or different from each other are linear or branched perfluoroalkyls having from 1 to 12 C atoms; b' is an integer from 0 to 4, preferably 0 or 1; R$_{f''}$ can contain one hydrogen atom on the chain end carbon.

The following compounds can be mentioned as examples: C$_8$F$_{17}$—O—C$_2$F$_4$H, C$_7$F$_{15}$—O—C$_2$F$_4$H, C$_6$F$_{13}$—O—C$_2$F$_4$—O—C$_2$F$_4$H, C$_4$F$_9$—O—C$_2$F$_4$H, HC$_2$F$_4$—O—C$_2$F$_4$—O—C$_2$F$_4$H, C$_4$F$_9$—O—(CF$_2$)$_5$H.

The above fluorooxyalkylenes are known and are described in the patent WO 95/32174. Other preferred fluorooxyalkylenes have general formula:

wherein R$_f$ has the above mentioned meaning and R$_h$ is a linear or branched hydrogenated alkyl having from 1 to 10 C atoms. The preferred compound is the one in which R$_f$=C$_4$F$_9$ and R$_h$=CH$_3$.

The end groups of the above mentioned fluoro(poly) oxyalkylenes can optionally contain one Cl atom instead of one F atom.

The solutions obtainable at low temperature by the invention process can be used in the preparation of ionic exchange membranes used in fuels cells and in electrolytic processes.

The present invention will be now furtherly illustrated from the following working examples, which cannot in any way limit the scope of the invention itself.

EXAMPLES

Characterization

Dynamic Laser Light Scattering (DLLS) Analysis

An argon laser having a wave length of 514.5 nm with a 300 mW power so as to measure the size of the aggregates present in the solution. The dynamic method is based on the recordal of an autocorrelation curve correlating the scattering intensity and the relaxation time of the scattering particles. It is thus possible to draw a Γ relaxation rate, which is proportional to the D diffusion coefficient of the scattering species:

$$\Gamma = D*q^2$$

where q represents the wave vector which is expressed as follows:

$$q = (4\pi n/\lambda) \sin(\theta/2)$$

where n is the medium refractive index, λ is the wavelength and θ is the scattering angle at which the measurements are determined.

The D diffusion coefficient is related to the diameter of the scattering particles by the Stokes-Einstein equation:

$$D = kT/3\pi\eta\phi$$

wherein K is the Boltzmann constant, T the temperature, η the medium viscosity and φ the diameter of the particles.

The so described method is applicable to diluted solutions to avoid multiple scattering effects due to the signal overlapping.

In the examples the concentration of 1% by weight of ionomer was used.

Example 1

A solution at 1k by weight of sulphonic ionomer obtained by polymerizing tetrafluoroethylene (TFE) with $CF_2=CFOCF_2CF_2-SO_2F$, converted in —SO$_3$H form and having equivalent weight (EW) equal to 770, was prepared by dissolution of the same in a ternary mixture constituted by H$_2$O(7.3% by weight), n-propanol (71% by weight) and one fluoropolyoxyalkylene (21.7% by weight) having the formula:

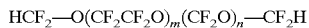

$$HCF_2-O(CF_2CF_2O)_m(CF_2O)_n-CF_2H$$

with boiling range from 120° C. to 180° C. and average molecular weight equal to 500. Such dissolution was carried out in a glass container equipped with magnetic stirring in which the temperature is controlled by thermostatic bath. After 2 hours at 70° C. the solution was ultracentrifuged at 22,000 rpm. for 1 hour and no presence of any precipitate was noticed.

Example 2

A solution at 10% by weight of sulphonic ionomer obtained by copolymerizing TFE with $CF_2=CFOCF_2CF_2SO_2F$, converted in —SO$_3$H form and having EW=770, was prepared by dissolution of the same in a ternary mixture constituted by H$_2$O(15% by weight), methanol (80%) and a fluoropolyoxyalkylene (5%) having the formula:

$$HCF_2-O(CF_2CF_2O)_m(CF_2O)_n-CF_2H$$

with boiling range between 80° C. and 120° C. and number average molecular weight equal to 350. Such dissolution was carried out in a glass container equipped with magnetic stirring wherein the temperature is controlled by thermostatic bath. After 24 hours at 50° C. the solution was completely transparent and the Brookfield viscosity measured at 25° C., was 24 cP. The dynamic laser light scattering

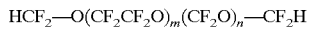

(LS) analysis showed a dispersed aggregate size of about 70 nm. A narrow monomodal distribution was observed.

The so obtained solution was deposited on a flat PTFE support by a stratifying knife having nominal thickness of 15 mils; after the solvent evaporation a transparent, homogeneous and continuous membrane, lacking of evident defects (mud crecks, holes), was obtained.

The optical microscopy and the Scanning Electron Microscopy (SEM) showed that the film surface was continuous and without the above mentioned defects.

Example 3

A solution at 10% by weight of sulphonic ionomer obtained by copolymerizing TFE with $CF_2=CFOCF_2CF_2SO_2F$, converted in —SO$_3$H form and having EW=770, was prepared by dissolution of the same in a ternary mixture constituted by H$_2$O(9.4% by weight), methanol (69%) and a fluoropolyoxyalkylene (21.6%) having the formula:

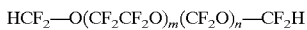

$$HCF_2-O(CF_2CF_2O)_m(CF_2O)_n-CF_2H$$

with boiling range between 120° C. and 180° C. and number average molecular weight equal to 500. The solution was put in a closed autoclave at 150° C. After 3 hours stirring was stopped and the autoclave was cooled. The solution was perfectly transparent and had a dry content equal to 9.5% by weight and a Brookfield viscosity at 25° C. equal to 55 cP. The dynamic laser light scattering (DLS) analysis showed a dispersed aggregate size of about 40–50 nm. A narrow monomodal distribution was observed.

Example 4

A solution at 1% by weight of sulphonic ionomer obtained by copolymerizing TFE with $CF_2=CFOCF_2CF_2SO_2F$, converted in —SO$_3$H form and having EW=770, was prepared by dissolution of the same in a ternary mixture constituted by H$_2$O(9.4% by weight), methanol (69%) and a fluoropolyoxyalkylene (21.6%) having the formula:

$$hCF_2-O(CF_2CF_2O)_m(CF_2O)_n-CF_2H$$

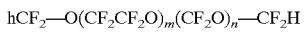

with boiling range between 120° C. and 180° C. and number average molecular weight equal to 500. Such dissolution was carried out in a glass container equipped with magnetic stirring wherein the temperature is controlled by thermostatic bath. After 2 hours at 70° C. the solution was ultracentrifugated at 22,000 rpm. for 1 h and no presence of any precipitate was noticed. The dynamic laser light scattering (DLLS) analysis showed a dispersed aggregate size of about 30 nm. A narrow monomodal distribution was observed.

Example 5 (Comparative)

A solution at 1% by weight of sulphonic ionomer obtained by copolymerizing TFE with $CF_2=CFOCF_2CF_2SO_2F$, converted in —SO$_3$H form and having EW=770, was prepared by dissolution of the same in a binary mixture constituted by water and methanol in the same relative ratios of Example 3 (H$_2$O 12% by weight, methanol 88%). Such dissolution was carried out in a glass container equipped with magnetic stirring wherein the temperature is controlled by thermostatic bath. After 2 hours at 70° C. the solution was ultracentrifugated at 22,000 rpm. for 1 h and no presence of any precipitate was noticed. The dynamic laser light scattering (DLS) analysis showed a dispersed aggregate size of about 150 nm.

Example 6

Example 2 has been repeated but using a sulphonic ionomer having EW=730.

The results obtained are similar to those of Example 2.

Example 7

Example 2 has been repeated but using a sulphonic ionomer having EW=750.

The results obtained are similar to those of Example 2.

Example 8

Example 2 has been repeated but using a sulphonic ionomer having EW=790.

The results obtained are similar to those of Example 2.

Example 9 (Comparative)

A solution was made by adding in a shaker tube 7.0 g. of the sulphonic ionomer having EW=778 to 50 ml of water and 15 ml of toluene. The mixture was heated to 230° C. for 5 hours with shaking. The vessel was allowed to cool to ambient temperature and the organic layer separated from the aqueous layer. The aqueous layer contained 11.5% of dry polymer and had a viscosity of 2 cP.

The DLLS analysis showed a bimodal aggregate size distribution: the first distribution centered on a size of 23 nm and the second centered on a size of 123 nm.

What is claimed is:

1. A process for preparing a solution and/or dispersion containing sulphonic (per)fluorinated ionomers having —$SO_3M$ functional groups, wherein M is selected from H, Li, Na, K or $NR_4$ wherein R is equal to or different from each other are selected from H, $CH_3$, $C_2H_5$, characterized in that it dissolves the above defined ionomers at a temperature comprised between room temperature and about 150° C., in a monophasic ternary mixture essentially constituted by water in a percentage in the range of 0.1%–50% by weight, by a $C_1$–$C_4$ alcohol in a percentage in the range 50%–99% by weight and by a fluoro(poly)oxyalkylene having one hydrogen atom in at least a fluorinated end group, in a percentage in the range 0.1%–40% by weight; wherein the dispersed polymer particle sizes, determined by dynamic laser light scattering (DLLS), are in the range 30–100 nm.

2. A process for preparing a solution and/or dispersion containing sulphonic (per)fluorinated ionomers having —$SO_3M$ functional groups, wherein M is selected from H, Li, Na, K or $NR_4$ wherein R is equal to or different from each other and selected from H, $CH_3$, $C_2H_5$, characterized in that it dissolves the above defined ionomers at a temperature comprised between room temperature and about 50° C. and 100° C., in a monophasic ternary mixture essentially constituted by water in a percentage in the range of 0.1%–50% by weight, by a $C_1$–$C_4$ alcohol in a percentage in the range 50%–99% by weight and by a fluoro(poly)oxyalkylene having one hydrogen atom in both fluorinated end groups, in a percentage in the range 0.1%–40% by weight; wherein the dispersed polymer particle sizes, determined by dynamic laser light scattering (DLLS), are in the range 40–70 nm.

3. A process according to claim 1 wherein the sulphonic (per)fluorinated ionomers are obtained by polymerization of a monomer having structure (I) with a monomer having structure (II):

$$CF_2=CZZ' \quad (I)$$

wherein: Z and Z' are independently selected from H, Cl, F or $CF_3$;

$$CF_2=CF-[O-CF_2-CFY]_{p'}-O-CF_2-CFR_{fa}-SO_2F \quad (II)$$

wherein: Y is selected from F, $CF_3$; $R_{fa}$ is selected from F, Cl, $C_1$–$C_4$ perfluoroalkyl group, p' is an integer selected from 0, 1 or 2, obtaining perfluorinated sulphonic copolymers having the following repeating units:

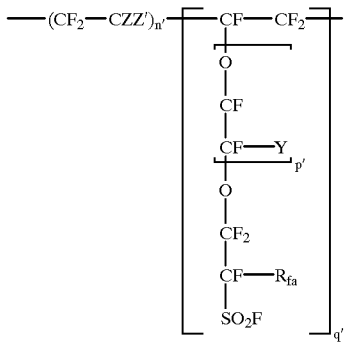

wherein: Z, Z', Y, $R_{fa}$, and p' have the above defined meaning; n' is an integer in the range of 1–15, q' is an integer in the range 1–10, n'/q' is in the range 1–10 and the ionomer equivalent weight (EW) is in the range of about 400–1300; and by the subsequent conversion of the —$SO_2F$ fluorosulphonic groups in the —$SO_3M$ ionic form wherein M is selected from H, Li, Na, K, $NR_4$ and R=H, $CH_3$, $C_2H_5$.

4. A process according to claim 2 wherein the sulphonic (per)fluorinated ionomers are obtained by polymerization of a monomer having structure (I) with a monomer having structure (II):

$$CF_2=CZZ' \quad (I)$$

wherein: Z and Z' are independently selected from H, Cl, F or $CF_3$;

$$CF_2=CF-[O-CF_2-CFY]_{p'}-O-CF_2-CFR_{fa}-SO_2F \quad (II)$$

wherein: Y is selected from F, $CF_3$; $R_{fa}$ is selected from F, Cl, $C_1$–$C_4$ perfluoroalkyl group, p' is an integer selected from 0, 1 or 2, obtaining perfluorinated sulphonic copolymers having the following repeating units:

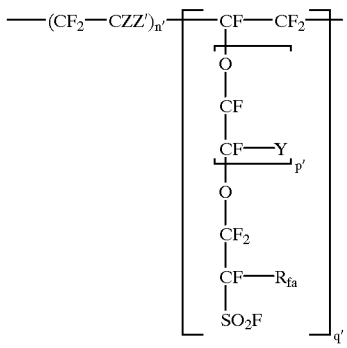

wherein: Z, Z', Y, $R_{fa}$, and p' have the above defined meaning; n' is an integer in the range of 1–15, q' is an integer in the range 1–10, n'/q' is in the range 1–10 and the ionomer equivalent weight (EW) is in the range of about 400–1300; and by the subsequent conversion of the —$SO_2F$ fluorosulphonic groups in the —$SO_3M$ ionic form wherein M is selected from H, Li, Na, K, $NR_4$ and R=H, $CH_3$, $C_2H_5$.

5. A process according to claim 1 wherein Z, Z'=F; $R_{fa}$=F and p'=0.

6. A process according to claim 1 wherein the ternary mixture comprised of water in amounts of 5–20% by weight, a $C_1$–$C_4$ primary alcohol in amounts of 65%–85% and by a fluoro(poly)-oxyalkylene having hydrogenated terminals and a boiling temperature in the range 80° C.–120° C., in amounts of 5%–25% by weight.

7. A process according to claim 1 wherein the amount of sulphonic perfluorinated ionomer ranges from about 0.5% to about 30% by weight.

8. A process according to claim 1 wherein alcohol is selected from methanol, ethanol, n-propanol, isopropano-1, butanol, isobutanol.

9. A process according to claim 1 wherein fluoropolyoxyalkylenes are comprised of one or more repeating units, statistically distributed along the chain, selected from: —CFZO—, —CF$_2$CFZO—, —CF$_2$CF(CF$_3$)O—, —CF(CF$_3$)O—, —CZ$_2$CF$_2$CF$_2$)O—, —CF$_2$CF(OR$_{fb}$)O— or —CF(OR$_{fb}$)O— wherein Z is —H or —F; R$_{fb}$ is —CF$_3$, —C$_2$F$_5$, or —C$_3$F$_7$; and by hydrogenated end groups selected from —CF$_2$H, —CF$_2$CF$_2$H, —CFH—CF$_3$, and —CFH—OR$_{fb}$, wherein R$_{fb}$ is as above defined, or perfluorinated end groups selected from —CF$_3$, —C$_2$F$_5$, and —C$_3$F$_7$, at least one of the end groups containing one hydrogen atom; said fluoropolyoxyalkylenes having an average molecular weight such that the boiling range, at the pressure of 1 atm, is generally in the range 25°–200° C.

10. A process according to claim 9 wherein the fluoropolyoxyalkylenes are selected from the following classes:

(a) $T_1$—O(CF$_2$—CF(CF$_3$)O)$_a$(CFXO)$_b$—$T_2$ wherein:
$T_1$ and $T_2$, equal to or different from each other, are —CF$_2$H, —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; a/b is in the range 5–15;

(b) $T_3$—O(CF$_2$CF$_2$O)$_c$(CF$_2$O)$_d$—$T_4$ wherein:
$T_3$ and $T_4$, equal to or different from each other, are —CF$_2$H or —CF$_2$—CF$_2$H hydrogenated groups, or —CF$_3$, —C$_2$F$_5$ perfluorinated groups, at least one of the end groups being hydrogenated, c/d is in the range 0.3–5;

(c) $T_5$—O(CF$_2$—CF(CF$_3$)O)$_e$(CF$_2$CF$_2$O)$_f$(CFXO)$_g$—$T_6$ wherein:
$T_5$ and $T_6$, equal to or different from each other, are —CF$_2$H, —CF$_2$CF$_2$H, or —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; e/(f+g) is in the range 1–10, f/g is in the range 1–10;

(d) $T_7$—O(CF$_2$—CF(CF$_3$)O)$_h$—$T_8$ wherein:
$T_7$ and $T_8$ are —CFH—CF$_3$ hydrogenated groups, or —C$_2$F$_5$, —C$_3$F$_7$ perfluorinated groups, at least one of the end groups being hydrogenated;

(e) $T_9$—O(CZ$_2$CF$_2$CF$_2$O)$_i$—$T_{10}$—wherein:
Z is F or H; $T_9$ and $T_{10}$, equal to or different from each other, are —CF$_2$H or —CF$_2$—CF$_2$H groups, or —CF$_3$, —C$_2$F$_5$, —C$_3$F$_7$ perfluorinated groups, at least one of the end groups being hydrogenated;

(f) $T_{11}$—O(CF$_2$O)$_j$(CF$_2$CF(OR$_{fb}$)O)$_k$(CF(OR$_{fb}$)O)$_l$—$T_2$ wherein:
R$_{fb}$ is CF$_3$, —C$_2$F$_5$, or —C$_3$F$_7$; $T_{11}$ and $T_{12}$, equal to or different from each other, are —CF$_2$H, —CF$_2$CF$_2$H, —CFH—OR$_{fb}$ groups, or —CF$_3$, —C$_2$F$_5$, —C$_3$F$_7$ perfluorinated groups, at least one of the end groups being hydrogenated; k+l and j+k+l are at least equal to 2, k/(j+i) is in the range $10^{-2}$–$10^3$, 1/j is in the range $10^{-2}$–$10^2$;

(g) $T_{13}$—O(CF$_2$—CF(CF$_3$)O)$_m$(CFXO)$_n$(CFHO)$_o$(CF$_2$CFHO)$_p$—$T_{14}$ wherein:
$T_{13}$ and $T_{14}$ are equal to or different from each other, are —CF$_2$H, —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; m/n is in the range 5–40, m/(o+p) is in the range 2–50, o+p is at least 3, or is lower than p;

(h) $T_{15}$—O(CF$_2$CF$_2$O)$_q$(CF$_2$O)$_r$(CFHO)$_s$(CF$_2$CFHO)$_t$—$T_{16}$ wherein:
$T_{15}$ and $T_{16}$, are equal to or different from each other, are —CF$_2$H, —CF$_2$—CF$_2$H hydrogenated groups, or —CF$_3$, —C$_2$F$_5$ perfluorinated groups, at least one of the end groups being hydrogenated; q/r is in the range 0.5–2, (q+r)/(s+t) is in the range 3–40, s+t is at least 3, s is less than t;

(i) $T_{17}$—O(CF$_2$—CF(CF$_3$)O)$_u$(CF$_2$CF$_2$O)$_v$(CFXO)$_w$(CFHO)$_x$(CF$_2$CFHO)$_y$—$T_{18}$ wherein:
$T_{17}$ and $T_{18}$, are equal to or different from each other, are —CF$_2$H, —CF$_2$CF$_2$H, —CFH—CF$_3$ hydrogenated groups, or —CF$_3$, —C$_2$F$_5$, —C$_3$F$_7$ perfluorinated groups, at least one of the end groups being hydrogenated; X is —F or —CF$_3$; (u+v)/w is in the range of 5–40, (u+v)/(x+y) is in the range 2–50, x+y is at least 3, x is lower than y.

11. A process according to claim 1 wherein the fluorooxyalkylenes have the formula:

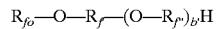

$R_{fo}$—O—$R_{f'}$—(O—$R_{f''}$)$_{b'}$H wherein $R_{fo}$, $R_{f'}$, and $R_{f''}$ are equal to or different from each other, are linear or branched perfluoroalkyls having from 1 to 12 C atoms; $R_{fo}$ can contain one hydrogen atom on the chain end carbon; b' is an integer from 0 to 4; or they have the formula:

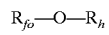

$R_{fo}$—O—$R_h$ wherein $R_{fo}$ has the above mentioned meaning and $R_h$ is a linear or branched hydrogenated alkyl having from 1 to 10 C atoms.

12. Liquid compositions obtained according to claim 1 comprising a perfluorinated ionomer amount in the range 0.5–30% by weight, having an equivalent weight from about 400 to 1300 and dispersed particle sizes in the range 30–100 nm.

13. Liquid compositions obtained according to claim 1 having an equivalent weight from 640–800 and particle sizes in the range 40–70 nm.

* * * * *